United States Patent

Björnsson et al.

[11] Patent Number: 6,142,179
[45] Date of Patent: Nov. 7, 2000

[54] FEED AND FILTERING SYSTEM FOR LIQUID MEDIA SUCH AS FUELS

[76] Inventors: Aegir Björnsson; Björn Björnsson, both of Vallgatan 17, S-450 43, Smögen, Sweden; Arvid Corneliussen, Skjoldv. 4lf, N-5221, Nesttun, Norway

[21] Appl. No.: 09/403,295
[22] PCT Filed: Mar. 24, 1998
[86] PCT No.: PCT/SE98/00533
§ 371 Date: Oct. 18, 1999
§ 102(e) Date: Oct. 18, 1999
[87] PCT Pub. No.: WO98/48164
PCT Pub. Date: Oct. 29, 1998

[30] Foreign Application Priority Data

Apr. 18, 1997 [SE] Sweden .................................. 9701445

[51] Int. Cl.7 .................................................... B67D 5/40
[52] U.S. Cl. .............................. 137/565.37; 137/565.16; 137/571; 137/544; 137/563; 123/514
[58] Field of Search .................... 137/565.37, 565.34, 137/565.16, 563, 571, 576, 544, 574, 395; 123/509, 514

[56] References Cited

U.S. PATENT DOCUMENTS

| | | | |
|---|---|---|---|
| 2,508,170 | 5/1950 | Kaufmann | 137/571 |
| 2,860,785 | 11/1958 | Gardner | 137/563 |
| 4,506,986 | 3/1985 | Freeman | 366/142 |
| 4,723,573 | 2/1988 | Burnett | 137/587 |
| 4,869,225 | 9/1989 | Nagata et al. | 123/509 |
| 4,911,134 | 3/1990 | Olsson | 123/514 |
| 4,928,657 | 5/1990 | Asselin | 123/514 |
| 5,642,718 | 7/1997 | Nakai et al. | 123/509 |

FOREIGN PATENT DOCUMENTS

| | | |
|---|---|---|
| 0 594 614 B1 | 5/1994 | European Pat. Off. . |
| 94/11630 | 5/1994 | WIPO . |

*Primary Examiner*—A. Michael Chambers
*Attorney, Agent, or Firm*—Lerner, David, Littenberg, Krumholz, & Mentlik, LLP

[57] ABSTRACT

Apparatus for feeding fuel to an engine is disclosed including a storage tank and a supply tank, the storage tank having a substantially greater volume than the supply tank, a filter, a first conduit for feeding the fuel from the storage tank to the filter to provide filtered fuel, a second conduit for feeding the filtered fuel from the filter to the supply tank, a third conduit for supplying the filtered fuel from the supply tank to the engine, and a fourth conduit for recirculating excess fuel from the supply tank to the storage tank.

7 Claims, 1 Drawing Sheet

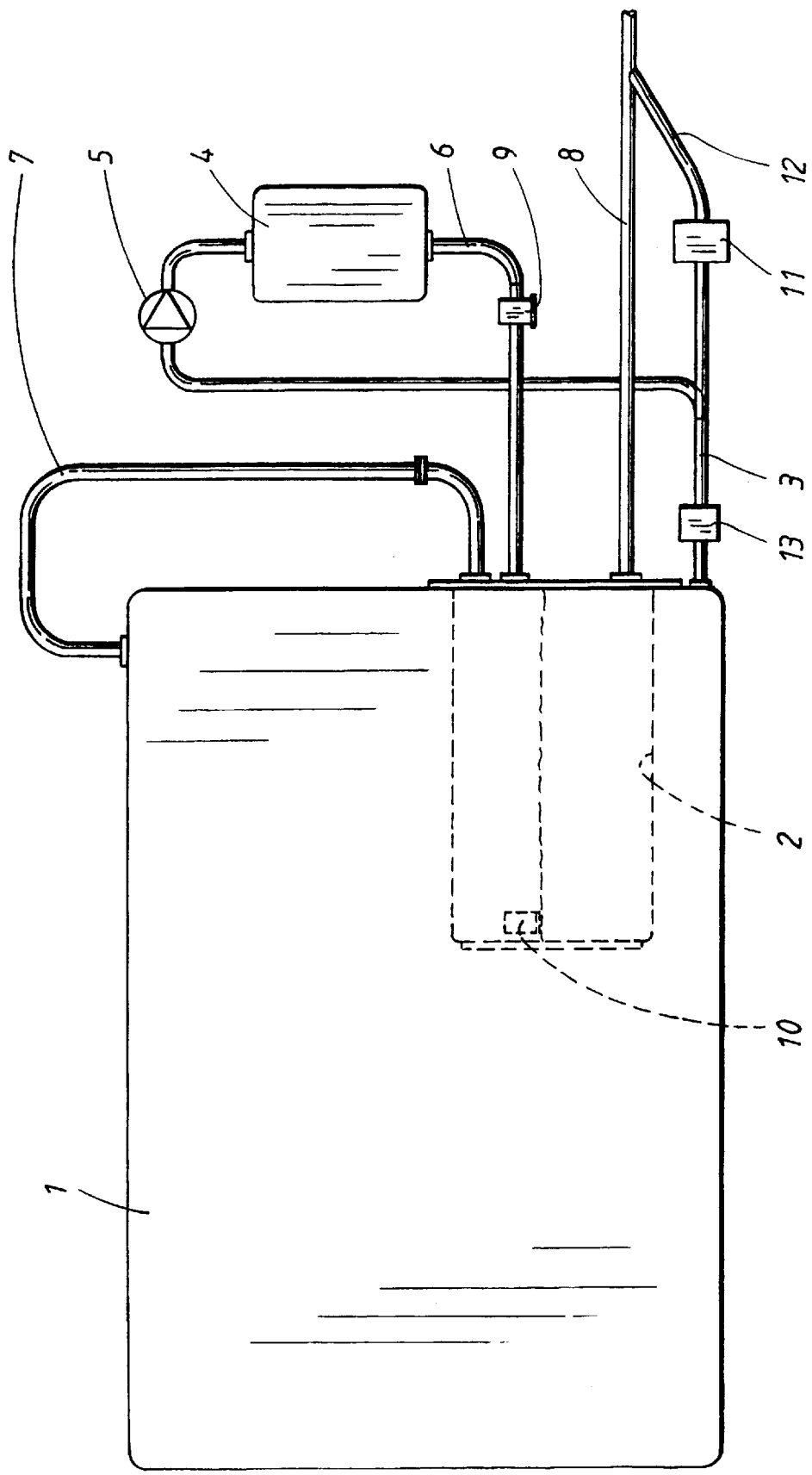

FEED AND FILTERING SYSTEM FOR LIQUID MEDIA SUCH AS FUELS

TECHNICAL FIELD

The present invention relates to a feed and filtering system for liquid media such as fuels and it relates especially to a feed and filtering system to be used with lorries, such as trailers, which are driven with diesel oil as well as boats.

PRIOR ART

Certain demands, which can be very strict, are generally put on liquid media to be used, for example, as fuels or as starting agents for chemical reactions. These media must be free from solid particles which on the one hand can clog injection nozzles and on the other hand can cause deposits in the supply pipes and they must in many cases to the greatest possible extent be free from water. This applies especially to diesel oil for combustion engines. Additionally, it is very important that these media do not contain bacteria which, in the presence of even small amounts of water, propagate and clog pipes valves and injection nozzles. With regard to diesel oil, the sulphur content in these has, for environmental reasons, been removed or decreased. The sulphur is a poison to many bacteria and these will therefore have the opportunity to thrive in the new oils.

Diesel oil and other liquid media have therefore always been filtered to remove various contaminants on the way from the storage tank to the place of consumption. In lorries, for example trailers, such filters are located between the storage tank and the engine and in large boats between the bunker tank in the bottom of the boat and the day tank located higher up and possibly between this and the diesel engine. These filters may be of different kinds but an especially suitable filter is described in the European patent specification 594614.

WO-A-94/11630 describes an arrangement for supplying fuel to combustion engines with different mixing ratios of fuel qualities having a larger and a smaller tank, the smaller tank being arranged within the larger tank. The two tanks contain different fuels which are mixed in the smaller tank.

TECHNICAL PROBLEM

Even if in the known systems the liquid media can be purified in an effective way, today more serious demands are put on their purity. This applies especially to the water content which sometimes may be very large due to the fact that the storage tanks are surrounded by humid atmosphere and are not filled. The water content also promotes the bacteria formation. Since engines run with an ever-increasing engine speed and the pressure of the oil before the injection moment increases from, for example, 300–400 Bar to 1000–1500 Bar higher demands are also made on the purity with regard to solid particles.

THE SOLUTION

According to the present invention, the problems with the known system have been solved by bringing about a feed and filtering system for liquid media, such as fuels, comprising a storage tank, a day tank, a filter for solid agents and possibly water and a pipe system for connecting the different parts, the day tank, which has an appreciably smaller volume than the storage tank, being located within the latter, which is characterized in that a pipe connection being arranged for non-purified medium between the storage tank and the filter and for purified medium between the filter and the day tank and that the day tank is provided with a feeding out pipe for the medium to the place of consumption and recirculation pipe for excess purified medium to the storage tank.

According to the invention, it is suitable that the filter and the pump system thereto have an appreciably higher capacity (5–10 times) than the consumption of medium so that the day tank is always kept filled and the medium flows through the recirculation system.

According to the invention, it is suitable to arrange a bacteria-eliminator in the pipe connection between the storage tank and the filter.

A water sensor may, according to the invention, be arranged in the pipe system for purified medium between the filter and the day tank.

According to the invention it is suitable that a level sensor is arranged in the day tank which at too low medium level therein is arranged to open a spare valve in a conduit between the pipe connection from the tank and the feeding out pipe.

The invention is especially suitable when the medium is diesel oil and the place of consumption is a diesel engine.

DESCRIPTION OF THE FIGURE

The invention will in the following be described more in detail in connection with the attached drawing which schematically shows an arrangement according to the present invention.

DETAILED DESCRIPTION

A storage tank 1 of the kind which is used for large lorries or in the bottom of boats for storing, for example, diesel oil is shown in the FIGURE. Such a tank can, when used for diesel oil in cars, hold 300–500 liters but if it is used as a bunker tank in a ship it will of course hold many cubic meters. When used for chemical reactions, the tank 1 may have different sizes dependent on which chemical process method is to be used.

Further, the FIGURE shows a so-called day tank 2 within the large storage tank 1. The size of this day tank 2 may suitably be about ¹⁄₁₀ of the large storage tank 1. In the FIGURE, the day tank 2 is connected by its pipe connections at the lower part of the wall of the tank 1. It can however be connected at a much higher level or hang down from the upper part of the tank 1. In such a case the risk of leakage at the pipe connections is smaller.

From the very lowest part of the storage tank 1 a feeding out pipe 3 is connected which at the other end is connected to the upper part of a filter 4. To bring about a circulation, a pump 5 is arranged in this pipe 3. From the filter 4 a pipe 6 for purified liquid is connected to the day tank 2. From the day tank 2 a further pipe 7 which ends into the storage pipe 1 is attached. This pipe 7 is intended to return purified liquid from the filter 4 to the tank 1.

From the day tank 2 a feeding out pipe 8 which works as a feeding pipe to the place of consumption for the liquid, for example a nozzle in a diesel engine is arranged.

The capacity of the filter 4 and the pump 5 which feeds medium to the filter 4 is much larger than the feeding into the place of consumption for the liquid, which feeding goes through the conduit 8 which means that the day tank 2 always will be completely filled and excess medium will flow out from the day tank 2 through the conduit 7. The content in the storage tank 1 will therefore become cleaner and cleaner as the arrangement works.

It is however possible that the filter 4 may be partly clogged during operation. A sensor 9 which senses impurities, for example water, has therefore been arranged in the pipe 6. This sensor 9 can give a signal to the driver or operator of the purifying arrangement which means that the filter 4 must be changed. In such a case the liquid level in the day tank 2 will sink since no or too little liquid medium will be supplied and a level sensor 10 has therefore been arranged at a suitable place in the day tank 2. This level sensor 10 shall, in a way known per se, open a valve 11 in a conduit 12 between the outfeeding pipe 3 from the tank and the feeding out pipe 8. When this valve 11 is open and no liquid flows through the filter, non-purified liquid in the storage tank 1 will go directly to the place of consumption. The valve 11 must then be regarded as an emergency valve. If, however, the storage tank 1 is gradually becoming empty, this is not very serious since the medium in the storage tank 1 will for the most part already have passed the filter and is beginning to become fairly clean.

According to the invention, it is suitable that a bacteria eliminator 13 is arranged in the outfeeding pipe 3. This eliminator is known per se and acts as a bacteria killer by means of a magnetic field.

The best bacteria killer is however the absence of water. No water means no life. Due to the fact that the water is absorbed in the filter 4 and liquid is allowed to flow therethrough several times, the very conditions for the bacterial life will disappear.

By the arrangement according to the present invention it has been possible to purify liquid media from both solid particles and water in a simple way and to such a degree that it fulfils high expectations. The exhaust gases in a diesel engine will for example be much cleaner since the impurities in the form of solid particles are due to solid particles in the used diesel oil. It has been shown in tests that the impurities in the exhaust gases have been lowered by 15–30%.

When the arrangement according to the present invention is used it has also been shown that the injection nozzles to the diesel engines have not been clogged nearly so quickly as with conventional purifying. In a diesel engine for boats the injection nozzles must usually be exchanged about once a month, whereas if the purification arrangement according to the invention is used it suffices with an exchange of these injectors once every second year.

The invention is not limited to the embodiments shown but it can be varied in different ways within the scope of the claims.

What is claimed is:

1. Apparatus for feeding a liquid medium to a predetermined location comprising a storage tank having a first volume, a supply tank having a second volume mounted within said storage tank, said first volume being substantially greater than said second volume, a filter for said liquid medium, a first conduit for feeding said liquid medium from said storage tank to said filter to provide filtered liquid medium, a second conduit for feeding said filtered liquid medium from said filter to said supply tank, a third conduit for supplying said filtered liquid medium from said supply tank to said predetermined location, and a fourth conduit for recirculating excess filtered liquid medium from said supply tank to said storage tank.

2. The apparatus of claim 1 wherein said predetermined location comprises a site for consumption of said liquid medium at a first consumption rate, said apparatus including a pump for pumping said liquid medium from said storage tank to said filter at a second consumption rate, said second consumption rate being greater than said first consumption rate, whereby said supply tank is maintained filled with said filtered liquid medium and excess filtered liquid medium flows through said fourth conduit.

3. The apparatus of claim 2 wherein said second consumption rate is at least about 5 to 10 times greater than said first consumption rate.

4. The apparatus of claim 1 including a bacterial elimination member disposed in said first conduit.

5. The apparatus of claim 1 including sensor means for sensing the presence of impurities in said liquid medium, said sensing means being disposed in said second conduit.

6. The apparatus of claim 1 including a fifth conduit for connecting said first conduit to said third conduit, a valve disposed in said fifth conduit, and level sensing means disposed in said supply tank whereby upon said level sensing means sensing a predetermined low level of said filtered liquid medium in said supply tank, said valve is actuated to supply said liquid medium from said storage tank to said third conduit through said fifth conduit.

7. The apparatus of claim 1 wherein said liquid medium comprises diesel fuel and said predetermined location comprises a diesel engine.

\* \* \* \* \*

UNITED STATES PATENT AND TRADEMARK OFFICE
CERTIFICATE OF CORRECTION

PATENT NO. : 6,142,179
DATED : November 7, 2000
INVENTOR(S) : Björnsson et al.

It is certified that error appears in the above-identified patent and that said Letters Patent is hereby corrected as shown below:

The title page should be deleted and replaced with the attached title page, to reflect the corrected Abstract.

Delete columns 1-6 and substitute columns 1-6.

Signed and Sealed this

Sixth Day of May, 2003

JAMES E. ROGAN
*Director of the United States Patent and Trademark Office*

United States Patent [19]
Björnsson et al.

[10] Patent Number: 6,142,179
[45] Date of Patent: Nov. 7, 2000

[54] FEED AND FILTERING SYSTEM FOR LIQUID MEDIA SUCH AS FUELS

[76] Inventors: Aegir Björnsson; Björn Björnsson, both of Vallgatan 17, S-450 43, Smögen, Sweden; Arvid Corneliussen, Skjoldv. 41f, N-5221, Nesttun, Norway

[21] Appl. No.: 09/403,295

[22] PCT Filed: Mar. 24, 1998

[86] PCT No.: PCT/SE98/00533

§ 371 Date: Oct. 18, 1999

§ 102(e) Date: Oct. 18, 1999

[87] PCT Pub. No.: WO98/48164

PCT Pub. Date: Oct. 29, 1998

[30] Foreign Application Priority Data

Apr. 18, 1997 [SE] Sweden ................................ 9701445

[51] Int. Cl.⁷ ........................................................ B67D 5/40
[52] U.S. Cl. .................... 137/565.37; 137/565.16; 137/571; 137/544; 137/563; 123/514
[58] Field of Search .................. 137/565.37, 565.34, 137/565.16, 509, 514, 563, 571, 576, 544, 574, 395

[56] References Cited

U.S. PATENT DOCUMENTS

| | | | |
|---|---|---|---|
| 2,508,170 | 5/1950 | Kaufmann | 137/571 |
| 2,860,785 | 11/1958 | Gardner | 137/563 |
| 4,506,986 | 3/1985 | Freeman | 366/142 |
| 4,723,573 | 2/1988 | Burnett | 137/587 |
| 4,869,225 | 9/1989 | Nagata et al. | 123/509 |
| 4,911,134 | 3/1990 | Olsson | 123/514 |
| 4,928,657 | 5/1990 | Asselin | 123/514 |
| 5,642,718 | 7/1997 | Nakai et al. | 123/509 |

FOREIGN PATENT DOCUMENTS

| | | |
|---|---|---|
| 0 594 614B1 | 5/1994 | European Pat. Off.. |
| 94/11630 | 5/1994 | WIPO. |

*Primary Examiner*—A. Michael Chambers
*Attorney, Agent, or Firm*—Lerner, David, Littenberg, Krumholz & Mentlik, LLP

[57] ABSTRACT

Apparatus for feeding fuel to an engine is disclosed including a storage tank and a supply tank, the storage tank having a substantially greater volume than the supply tank, a filter, a first conduit for feeding the fuel from the storage tank to the filter to provide filtered fuel, a second conduit for feeding the filtered fuel from the filter to the supply tank, a third conduit for supplying the filtered fuel from the supply tank to the engine, and a fourth conduit for recirculating excess fuel from the supply tank to the storage tank.

7 Claims, 1 Drawing Sheet

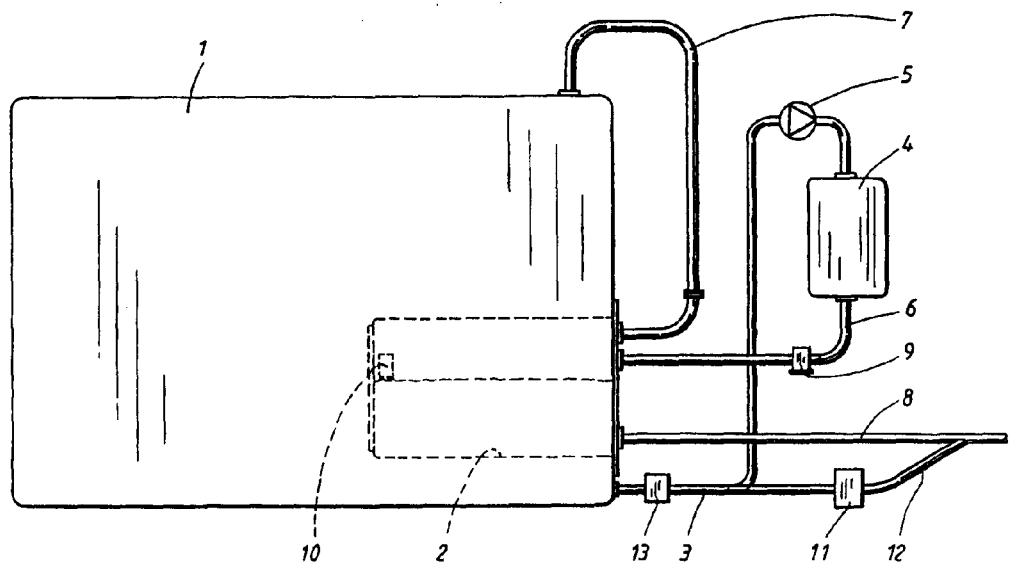

FEED AND FILTERING SYSTEM FOR LIQUID MEDIA SUCH AS FUELS

FIELD OF THE INVENTION

The present invention relates to a feed and filtering system for liquid media, such as fuels. More particularly, the present invention relates to a feed and filtering system to be used with trucks, such as trailers, which are driven with diesel oil, as well as boats.

BACKGROUND OF THE INVENTION

Certain demands, some of which can be very stringent, are generally placed upon liquid media to be used, for example, as fuels or as reactants for chemical reactions. These media must be free from solid particles, which on the one hand can clog injection nozzles and on the other hand can create deposits in the supply pipes, and they must in many cases be free of water to the greatest possible extent. This applies especially to diesel fuel for use in internal combustion engines. Additionally, it is important that these media do not contain bacteria which, in the presence of even small amounts of water, propagate and clog pipes, valves and injection nozzles. With regard to diesel oil, the sulphur content has, for environmental reasons, been eliminated or at least decreased. The sulphur is a poison to many bacteria, which will therefore have the opportunity to thrive in these new oils.

Diesel oil and other liquid media have therefore been filtered in order to remove various contaminants, and this is generally done on the way from the storage tank to the place of consumption. In trucks, for example trailers, these filters are generally located between the storage tank and the engine, and in large boats between the bunker tank in the bottom of the boat and the day tank located higher up and possibly between the tank and the diesel engine. These filters may be of different types, but a suitable filter is described in the European Patent Specification 594,614.

WO-A-94/11630 describes an arrangement for supplying fuel to combustion engines with different mixing ratios of fuel qualities having a larger and a smaller tank, the smaller tank being arranged within the larger tank. The two tanks contain different fuels which are mixed in the smaller tank.

Even if the liquid media can be purified in an effective way in the known systems, today more serious demands are put on their purity. This particularly applies to the water content, which may be very large due to the fact that the storage tanks are surrounded by humid atmosphere, and are not filled. The water content also promotes the formation of bacteria. Since engines run with an ever-increasing engine speed and the pressure of the oil before the moment of injection increases from, for example, about 300 to 400 Bar to about 1000 to 1500 Bar, higher demands are also made on the degree of purity with regard to solid particles.

SUMMARY OF THE INVENTION

In accordance with the present invention, this and other problems have now been overcome by the invention of apparatus for feeding a liquid medium to a predetermined location comprising a storage tank having a first volume, a supply tank having a second volume mounted within the storage tank, the first volume being substantially greater than the second volume, a filter for the liquid medium, a first conduit for feeding the liquid medium from the storage tank to the filter to provide filtered liquid medium, a second conduit for feeding the filtered liquid medium from the filter to the supply tank, a third conduit for supplying the filtered liquid medium from the supply tank to the predetermined location, and a fourth conduit for recirculating excess filtered liquid medium from the supply tank to the storage tank. In accordance with a preferred embodiment, the predetermined location comprises a site for consumption of the liquid medium at a first consumption rate, and the apparatus includes a pump for pumping the liquid medium from the storage tank to the filter at a second consumption rate, the second consumption rate being greater than the first consumption rate, whereby the supply tank is maintained filled with the filtered liquid medium and excess filtered liquid medium flows through the fourth conduit. Preferably, the second consumption rate is at least about 5 to 10 times greater than the first consumption rate.

In accordance with one embodiment of the apparatus of the present invention the apparatus includes a bacterial elimination member disposed in the first conduit.

In accordance with another embodiment of the apparatus of the present invention, the apparatus includes sensor means for sensing the presence of impurities in the liquid medium, the sensing means being disposed in the second conduit.

In accordance with another embodiment of the apparatus of the present invention, the apparatus includes a fifth conduit for connecting the first conduit to the third conduit, a valve disposed in the fifth conduit, and level sensing means disposed in the supply tank whereby upon the level sensing means sensing a predetermined low level of the filtered liquid medium in the supply tank, the valve is actuated to supply the liquid medium from the storage tank to the third conduit through the fifth conduit.

In accordance with another embodiment of the apparatus of the present invention, the liquid medium comprises diesel fuel and the predetermined location comprises a diesel engine.

According to the present invention, the problems with known system have been solved by the invention of a feed and filtering system for liquid media, such as fuels, comprising a storage tank, a day tank, a filter for solid agents, and possibly water, and a pipe system for connecting the different parts. The day tank, which has an appreciably smaller volume than the storage tank, is located within the latter, and a pipe connection is arranged for non-purified medium between the storage tank and the filter and for purified medium between the filter and the day tank, and the day tank is provided with a feeding out pipe for the medium to the place of consumption, and a recirculation pipe for excess purified medium to the storage tank.

According to the present invention, it is preferable that the filter and the pump system thereto have an appreciably higher capacity (preferably about 5 to 10 times) than the consumption of the medium, so that the day tank is always kept filled and the medium flows through the recirculation system.

According to the present invention, it is preferable to arrange a bacteria-eliminator in the pipe connection between the storage tank and the filter.

A water sensor may, according to the present invention, be arranged in the pipe system for purified medium between the filter and the day tank.

According to the present invention it is preferable that a level sensor is arranged in the day tank, which at too low a medium level therein is arranged to open a valve in a conduit between the pipe connection from the tank and the feeding out pipe.

The present invention is particularly useful when the medium is diesel oil and the place of consumption is a diesel engine.

BRIEF DESCRIPTION OF THE DRAWINGS

The present invention will be more fully understood by reference to the following detailed description, which in turn refers to the attached drawing, which is a side, elevational, schematic representation of an arrangement according to the present invention.

DETAILED DESCRIPTION

A storage tank 1 of the type which is used for large trucks or in the bottom of boats for storing, for example, diesel oil, is shown in the Figure. Such a tank can, when used for diesel oil in cars, hold about 300 to 500 liters, but if it is used as a bunker tank in a ship, it can, of course, hold many cubic meters. When used for chemical reactions, the tank 1 may have different sizes dependent on which chemical process is to be used.

Further, the Figure shows a so-called day tank 2 within the large storage tank 1. The size of this day tank 2 may suitably be about 1/10 of the size of the large storage tank 1. In the Figure, the day tank 2 is connected by its pipe connections at the lower part of the wall of the tank 1. It can, however, be connected at a much higher level or hang down from the upper part of the tank 1. In that case, the risk of leakage at the pipe connections is reduced.

From the lowest portion of the storage tank 1 a feeding out pipe 3 is connected, which at the other end is connected to the upper part of a filter 4. To bring about a circulation, a pump 5 is arranged in this pipe 3. From the filter 4 a pipe 6 for purified liquid is connected to the day tank 2. From the day tank 2 a further pipe 7, which ends into the storage pipe 1, is attached. This pipe 7 is intended to return purified liquid from the filter 4 to the tank 1.

From the day tank 2 a feeding out pipe 8 which operates as a feeding pipe to the place of consumption for the liquid, for example a nozzle, is arranged in a diesel engine.

The capacity of the filter 4 and the pump 5 which feeds medium to the filter 4 is much larger than the capacity feeding into the place of consumption for the liquid, which feeding goes through the conduit 8, which means that the day tank 2 will always be completely filled, and excess medium will flow out from the day tank 2 through conduit 7. The contents of the storage tank 1 will therefore become cleaner and cleaner as the arrangement works.

It is, however, possible that the filter 4 may be partly clogged during operation. A sensor 9 which senses impurities, for example water, has therefore been arranged in the pipe 6. This sensor 9 can provide a signal to the driver or operator of the purifying arrangement, which indicates that the filter 4 must be changed. In such a case the liquid level in the day tank 2 will sink since either no liquid medium, or too little liquid medium, will be supplied and a level sensor 10 has therefore been arranged at a suitable place in the day tank 2. This level sensor 10 shall, in a manner which is known, open a valve 11 in a conduit 12 between the outfeeding pipe 3 from the tank and the feeding out pipe 8. When this valve 11 is open, and no liquid flows through the filter, non-purified liquid in the storage tank 1 will go directly to the place of consumption. The valve 11 must then be regarded as an emergency valve. If, however, the storage tank 1 is gradually emptying, this is not a very serious problem since the medium in the storage tank 1 will for the most part already have passed the filter, and is beginning to become fairly clean.

According to the present invention, it is preferable that a bacteria eliminator 13 be arranged in the outfeeding pipe 3. This eliminator is known and it acts as a bacteria killer by means of a magnetic field.

The best bacteria killer is however the absence of water. No water means no life. Due to the fact that the water is absorbed in the filter 4 and liquid is allowed to flow therethrough several times, the very conditions for the bacterial life will disappear.

By the arrangement according to the present invention it has been possible to purify liquid media from both solid particles and water in a simple manner and to such a degree that it fulfils high expectations. The exhaust gases in a diesel engine will, for example, be much cleaner in view thereof, since impurities in the form of solid particles are due to solid particles in the used diesel oil. It has thus been shown in tests that the impurities in the exhaust gases have been lowered by about 15 to 30%.

When the arrangement according to the present invention is used it has also been shown that the injection nozzles to the diesel engines have not become clogged nearly so rapidly as in the case with conventional purifying. In a diesel engine for boats the injection nozzles must usually be exchanged about once a month, whereas if the purification arrangement according to the invention is used it suffices with an exchange of these injectors once every second year.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for feeding a liquid medium to a predetermined location comprising a storage tank having a first volume, a supply tank having a second volume mounted within said storage tank, said first volume being substantially greater than said second volume, a filter for said liquid medium, a first conduit for feeding said liquid medium from said storage tank to said filter to provide filtered liquid medium, a second conduit for feeding said filtered liquid medium from said filter to said supply tank, a third conduit for supplying said filtered liquid medium from said supply tank to said predetermined location, and a fourth conduit for recirculating excess filtered liquid medium from said supply tank to said storage tank.

2. The apparatus of claim 1 wherein said predetermined location comprises a site for consumption of said liquid medium at a first consumption rate, said apparatus including a pump for pumping said liquid medium from said storage tank to said filter at a second consumption rate, said second consumption rate being greater than said first consumption rate, whereby said supply tank is maintained filled with said filtered liquid medium and excess filtered liquid medium flows through said fourth conduit.

3. The apparatus of claim 2 wherein said second consumption rate is at least about 5 to 10 times greater than said first consumption rate.

4. The apparatus of claim 1 including a bacterial elimination member disposed in said first conduit.

5. The apparatus of claim 1 including sensor means for sensing the presence of impurities in said liquid medium, said sensing means being disposed in said second conduit.

6. The apparatus of claim 1 including a fifth conduit for connecting said first conduit to said third conduit, a valve disposed in said fifth conduit, and level sensing means disposed in said supply tank whereby upon said level sensing means sensing a predetermined low level of said filtered liquid medium in said supply tank, said valve is actuated to supply said liquid medium from said storage tank to said third conduit through said fifth conduit.

7. The apparatus of claim 1 wherein said liquid medium comprises diesel fuel and said predetermined location comprises a diesel engine.

* * * * *